United States Patent [19]

Kinugawa et al.

[11] 4,257,377

[45] Mar. 24, 1981

[54] ENGINE CONTROL SYSTEM

[75] Inventors: Masumi Kinugawa; Hisamitsu Yamazoe, both of Kariya, Japan

[73] Assignee: Nippondenso Co., Ltd., Kariya, Japan

[21] Appl. No.: 81,905

[22] Filed: Oct. 4, 1979

[30] Foreign Application Priority Data

Oct. 5, 1978 [JP] Japan ................. 53-123186
Jul. 3, 1979 [JP] Japan ................. 54-84807

[51] Int. Cl.³ .............................................. F02B 3/00
[52] U.S. Cl. ................................ 123/492; 123/493; 123/480
[58] Field of Search ......... 123/32 CA, 32 EH, 32 EL

[56] References Cited

U.S. PATENT DOCUMENTS

| | | | |
|---|---|---|---|
| 3,759,231 | 9/1973 | Endo | 123/32 EH |
| 4,112,879 | 9/1978 | Assenheimer | 123/32 EH |
| 4,127,086 | 11/1978 | Harada | 123/32 EL |
| 4,184,458 | 1/1980 | Aoki | 123/32 EH |

Primary Examiner—Ronald B. Cox
Attorney, Agent, or Firm—Cushman, Darby & Cushman

[57] ABSTRACT

An engine control system which controls the engine fuel injection amount and the ignition timing by being supplied with and processing the rotational speed signal produced on the basis of the output of a rotational speed sensor producing the rotational speed signal at every predetermined engine crank shaft angle and an intake air amount signal from an air amount sensor for detecting the intake air amount of the engine. At certain predetermined engine rotational angles, the rotational speed signal and the intake air amount signal are read and compared with the previously-read rotational speed signal and intake air amount signal respectively, thus detecting changes therein respectively. These changes and signal values are used to correct control signals for ignition timing and fuel injection amount.

3 Claims, 9 Drawing Figures

FIG.5
| | |
|---|---|
| 1 | |
| 2 | |
| ⋮ | |
| P | $Q_{i-1}$ (FOR IGNITION TIMING) |
| P+1 | $N_{i-1}$ |
| P+2 | $Q_{i-1}$ (FOR EFI) |
| ⋮ | |
| B | $j_0$ |
| B+1 | $j_1$ |
| ⋮ | |
| B+E | $j_E$ |
| ⋮ | |
| J | $k_0$ |
| J+1 | $k_1$ |
| ⋮ | |
| J+H | $k_H$ |
| ⋮ | |
| M | $\ell_0$ |
| M+1 | $\ell_1$ |
| ⋮ | |
| M+K | $\ell_K$ |
| ⋮ | |
RAM / ROM
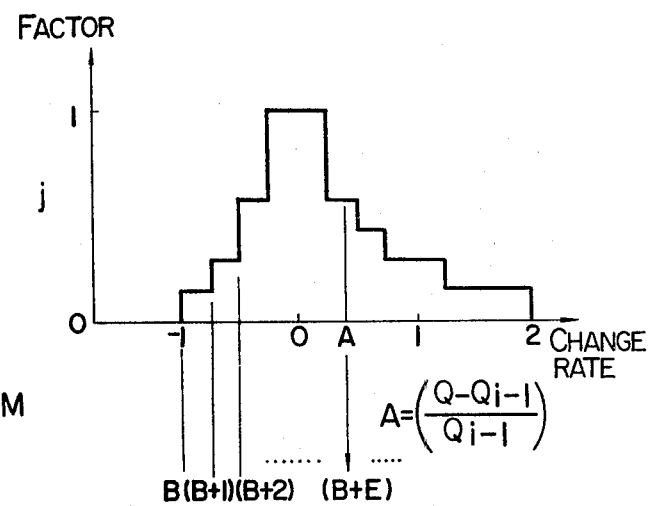
FIG.6
$$A = \left(\frac{Q - Q_{i-1}}{Q_{i-1}}\right)$$
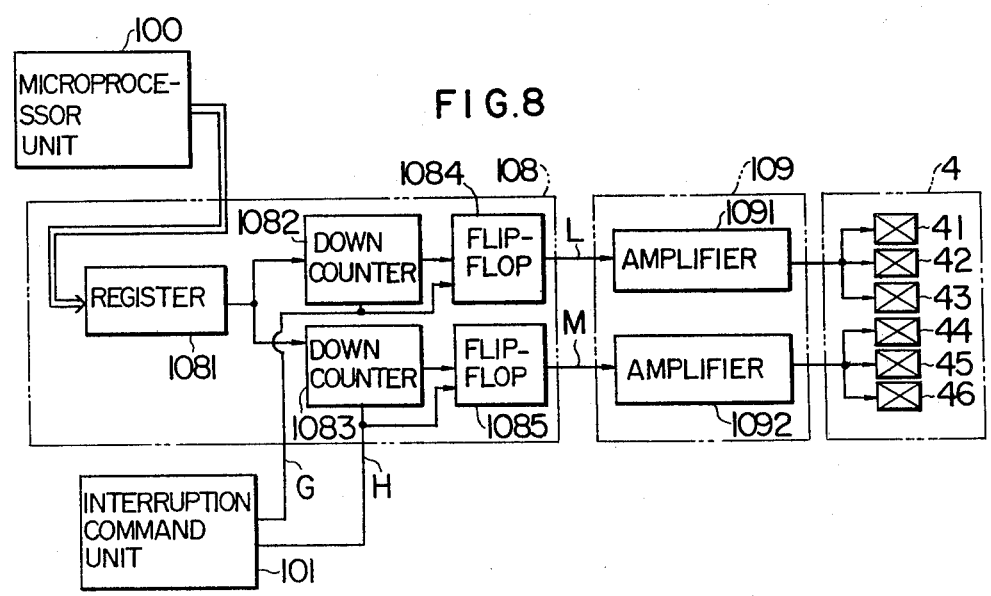
FIG.8

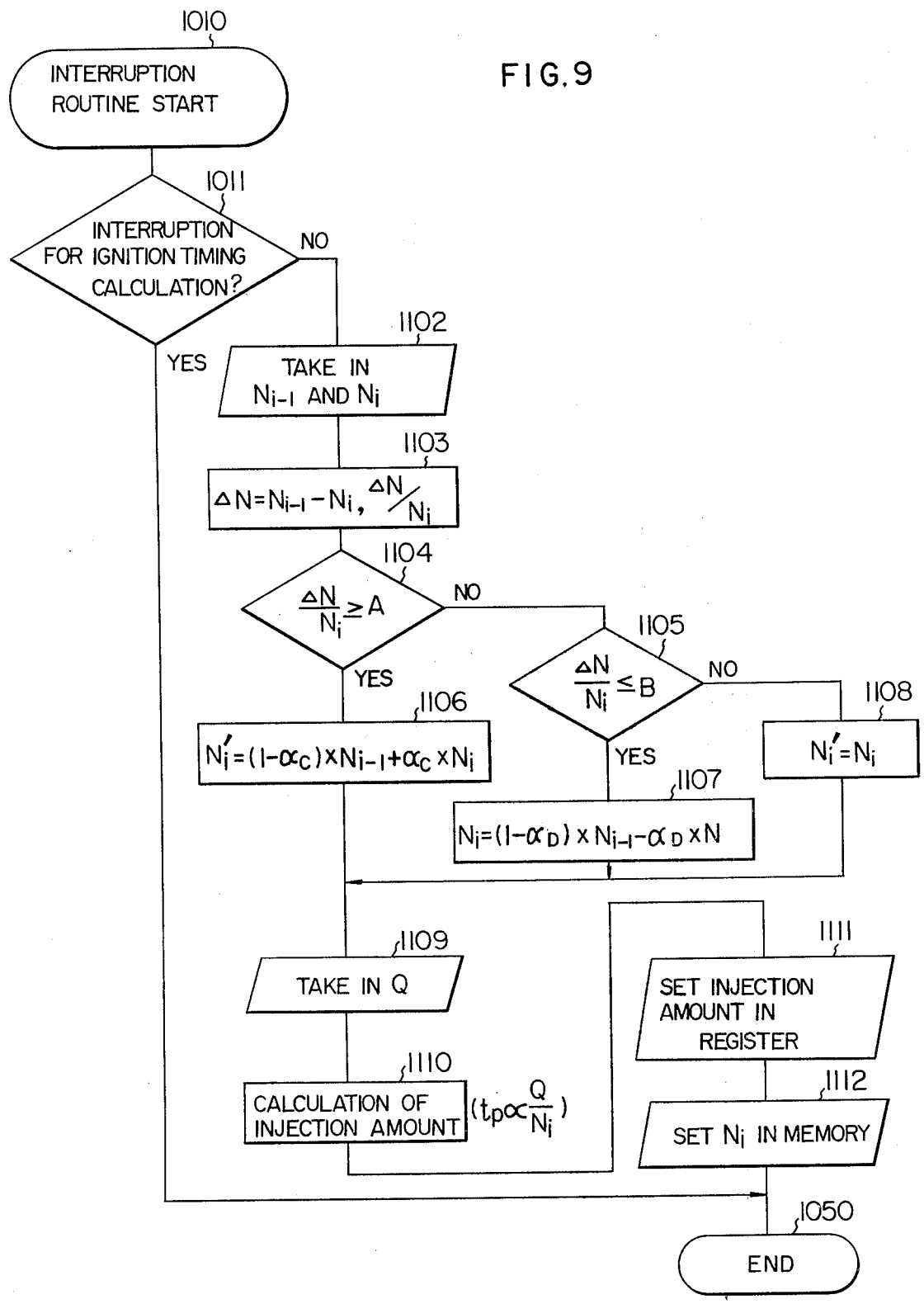

ENGINE CONTROL SYSTEM

BACKGROUND OF THE INVENTION

This invention relates to a method for controlling an engine or more in particular to a system for stably controlling the fuel injection amount, ignition timing or the like using an electronic control circuit even in a transient condition.

In a well-known control system for controlling the ignition timing or intermittent fuel injection using an electronic circuit, the flow rate of air taken into the engine per unit time and the rotational speed of the engine are detected, and in response to such values, the control amount is calculated. Such a calculation is repeated at a predetermined frequency or in synchronism with engine rotation, so that data on the air flow rate and rotational speed are detected and used within a short time in synchronism with the calculation. In order to detect the air flow rate, a rotational signal in the form of an electrical output from an air amount sensor arranged in the intake manifold or an electrical signal obtained from a rotary member rotated in synchronism with the crank shaft or cam shaft is used.

In a well-known air amount sensor comprising a sluice plate arranged in the intake manifold upstream of the throttle, in which the opening of the sluice plate changing with the air flow rate is converted into an air signal by a potentiometer, the motion of the sluice fails to correspond to the actual change in air flow rate in a transient condition where the driver suddenly opens or closes the throttle. As a result, the fuel injection amount or ignition timing calculated from this air flow rate signal develops an error temporarily, thus causing a vehicle vibration uncomfortable to the driver sometimes. More specifically, when the throttle is suddenly opened, the engine demands the fuel being increased through a kind of the primary delay system while the output of the air amount sensor exhibits a response characteristic like that of the secondary delay system. The additional fuel to be injected in response to such an operation of the throttle is short of or exceeds in amount the actual fuel requirement.

In the case where the engine is driven with the throttle full open and at low speed, the secondary vibration system is formed sometimes by the engine, the driving system and the vehicle system with the rotational speed as a parameter, thus starting a vibration at a natural frequency under certain conditions. In such a case, the fuel injection amount and ignition timing calculated from the original rotational speed develop an error, so that a change in rotation is promoted, thus often giving rise to a vehicle vibration uncomfortable to the driver continuously.

SUMMARY OF THE INVENTION

The present invention is developed in view of the above-mentioned fact and an object thereof is to provide a control system for controlling the engine in such a manner that at least one control amount is determined by at least one engine running parameter, wherein a change in at least one of such running parameters is detected for a given time or a given engine crank angle, the various running parameters are corrected on the basis of a change rate determined from such a change or the magnitude of the change and the respective running parameters, and the control value is determined on the basis of the value thus corrected, thereby preventing the above-mentioned promotion of the rotational change.

Another object of the present invention is to provide a control system wherein in order to prevent the amount of fuel supply from changing in the low engine speed range, the result of dividing the change in rotational speed ($\Delta N$) by the rotational speed (N), i.e., the change rate ($\Delta N/N$) is obtained at each calculation, and when the magnitude of this change rate exceeds a predetermined value, the rotational signal used for calculation for determining the fuel supply amount is corrected, so that the error in adjustment under a transient condition in the low engine speed and low load range is prevented, thus preventing a harmful rotational change from being promoted or continued.

With reference to the prevention of a change in the fuel supply amount in the range of low rotational speed, the amount of change $\Delta N$ is calculated from the equation below.

$$\Delta N = Ni-1 - Ni$$

where $Ni-1$ is a rotational speed signal sampled previously for calculation and $Ni$ a rotational speed signal sampled for current calculation. In the event that the rotational change rate $\Delta N/\Delta Ni$ is larger than a predetermined value, the value $Ni'$ used for calculation of the fuel supply amount is corrected in such a manner to achieve the relationship $$Ni' = (1-x) \times Ni-1 + a \times Ni < Ni$$

In this way, the harmful change in revolutions in the low rotational speed range is prevented.

According to the present invention, there is provided an engine control system wherein signals representing running parameters are corrected in response to the amount of change or change rate of the running parameters such as an intake air flow rate and rotational speed, and the corrected signals are used for calculating objects of control including the ignition timing and fuel injection amount. Thus the deviation of the air amount sensor signal from the actual air flow rate into the engine which may be caused when the driver suddenly opens or closes the throttle is corrected, thereby preventing any error which otherwise might occur in the ignition timing or fuel injection amount. Further, if a change occurs in the rotational speed under predetermined conditions, such a change is corrected promptly, thereby preventing the driver from feeling an uncomfortable vibration.

BRIEF DESCRIPTION OF THE DRAWINGS

FIG. 5 is a diagram for explaining the memory unit shown in FIG. 2.

FIG. 6 is a characteristic diagram of the memory unit shown in FIG. 2.

FIG. 8 is a block diagram showing a fuel injection time control counter unit shown in FIG. 2.

FIG. 9 is a flowchart schematically showing the processes of fuel injection control for preventing the change in fuel supply amount especially in the range of low rotational speed.

DESCRIPTION OF THE PREFERRED EMBODIMENTS

Figure 1:
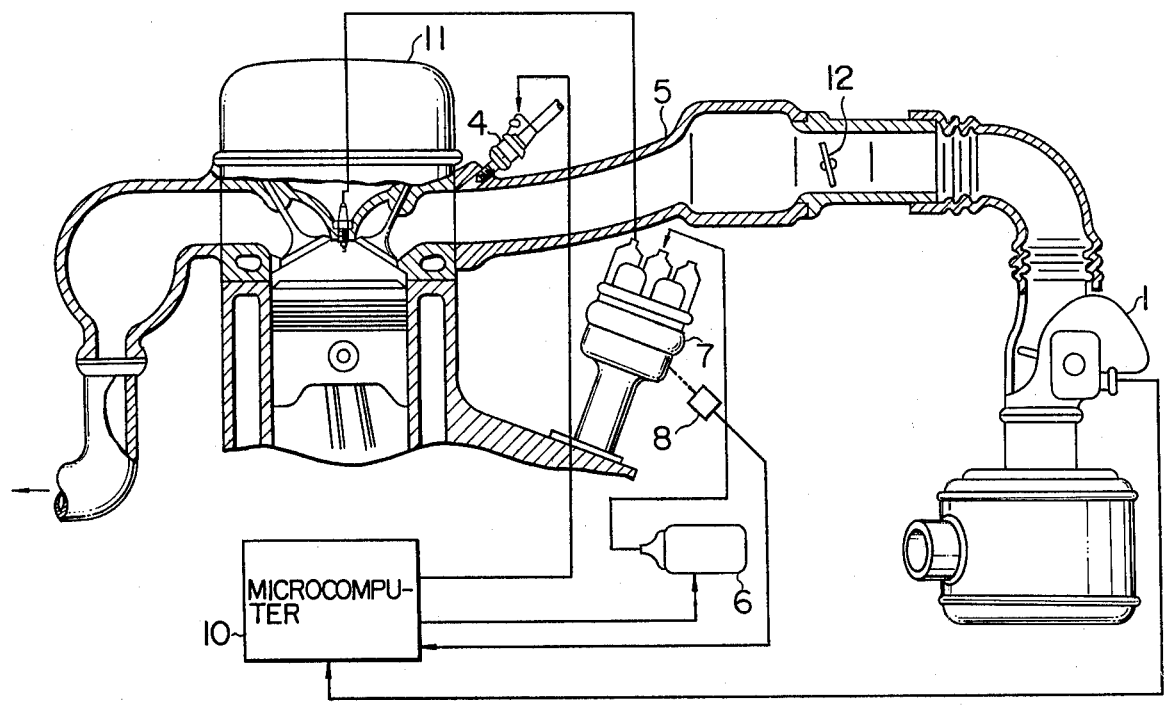
FIG. 1 is a diagram showing a configuration of an embodiment of the present invention.

An embodiment of the present invention will be explained with reference to the attached drawings. FIG. 1 shows a configuration of a 6-cylinder engine which employs the apparatus according to the present invention. In the drawings, reference numeral 1 shows an air amount sensor using a sluice plate for detecting the intake air amount of the engine, and numeral 4 an electromagnetically operated fuel injection valve placed in the vicinity of each cylinder intake port of the intake manifold 5, through which the fuel is supplied under predetermined pressure. Numeral 6 shows an ignition coil making up part of the engine ignition system, and numeral 7 a distributor for distributing ignition energy of the ignition coil 6 among the spark plugs of the respective cylinders. The distributor 7 makes on revolution for every two revolutions of the crank shaft as well known and contains a rotational angle sensor 8 for detecting an engine rotational angle. Numeral 10 shows a microcomputer making up a control circuit section for engine control, which is supplied with signals from the air amount sensor 1 and the rotational angle sensor 8, on the basis of which the amount of fuel injected into the engine from the fuel injection valve 4 and the engine ignition timing are calculated and controlled. Numeral 11 shows an engine body and numeral 12 an engine throttle valve.

Figure 2:
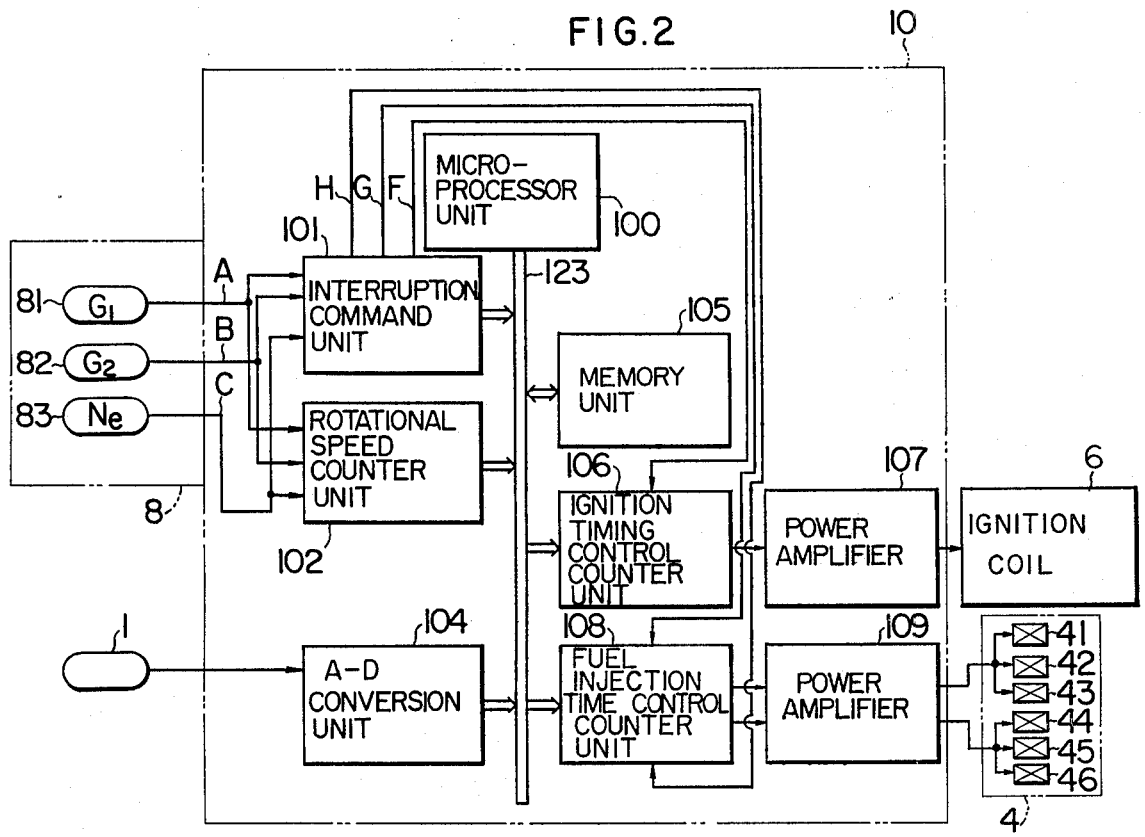
FIG. 2 is a block diagram showing a microcomputer included in FIG. 1.

A block diagram for explaining the microcomputer 10 in detail is shown in FIG. 2. In this drawing, numeral 100 shows a microprocessor unit (CPU) for calculating by interruption the fuel injection amount and ignition timing. Numeral 101 shows an interruption command unit for ordering the microprocessor unit 100 to interrupt and calculate the fuel injection amount and the ignition timing in response to a rotational angle signal produced from the rotational angle sensor 8 housed in the distributor 7. The data produced from the interruption command unit 101 is applied to the microprocessor unit 100 through a common bass 123. The interruption command unit 101 also produces a timing signal for controlling the timing of starting the operation of the units 106 and 108 mentioned later. Numeral 102 shows a counter unit impressed with a rotational signal from the rotational angle sensor 8 for calculating an engine r.p.m. by counting the period of a predetermined rotational angle in response to a clock signal of predetermined frequency from the microprocessor unit 100. Numeral 104 shows an A-D conversion unit for subjecting the signal from the air amount sensor 1 to an A-D conversion and causing it to be read into the microprocessor unit 100. The output data from these units 102 and 104 are applied to the microprocessor unit 100 through the common bass 123. Numeral 105 shows a memory unit for housing the control program of the microprocessor unit 100 on the one hand and storing the output data from the units 101, 102 and 104. Data are transmitted between the memory unit 105 and the microprocessor unit 100 through the common bass 123. Numeral 106 shows an ignition timing control counter unit including a register for calculating digital signals representing the timing for energizing and de-energizing the ignition coil, i.e., the ignition timing, calculated by the microprocessor unit 100, as a time and time point corresponding to the engine rotational angle (crank angle). Numeral 107 shows a power amplifier for amplifying the output of the ignition timing control counter unit 106 for energizing the ignition coil 6 while at the same time controlling the ignition timing, i.e., the timing for cutting off power supply to the ignition coil 6. Numeral 108 shows a fuel injection time control counter unit including a register. This counter unit 108 includes two down counters of the same function for converting the digital signal representing the opening time of the fuel injection valve 4 calculated by the microprocessor unit 100, i.e., the fuel injection amount, into a pulse signal of a pulse width representing an opening time of the fuel injection valve 4. Numeral 109 is a power amplifier for amplifying the pulse signal from the counter unit 108 and applying it to the fuel injection valve 4. There are provided two power amplifiers 109 corresponding to the counter unit 108.

The rotational angle sensor 8 includes three sensors 81, 82 and 83. As shown in the waveform diagram of FIG. 3A, the first rotational angle sensor 81 is for producing an angular signal A once for every two revolutions of the engine crank shaft, namely, one revolution of the distributor 7 at a position of angle $\theta$ before the crank angle of 0 degree. The second rotational angle sensor 82, on the other hand, is for producing an angle signal B once for every two revolutions of the engine crank shaft, as shown in the waveform diagram of FIG. 3B, at a position the angle $\theta$ before the crank angle of 360 degrees. Further, the third rotational angle sensor 83 is for producing, as seen from the waveform of FIG. 3C, angle signals C as many as engine cylinders at equal intervals, i.e., six angle signals C at equal intervals of 60 degrees from the crank angle of 0 degree for six cylinders as in the present embodiment, for every revolution of the crank shaft.

Figure 3:
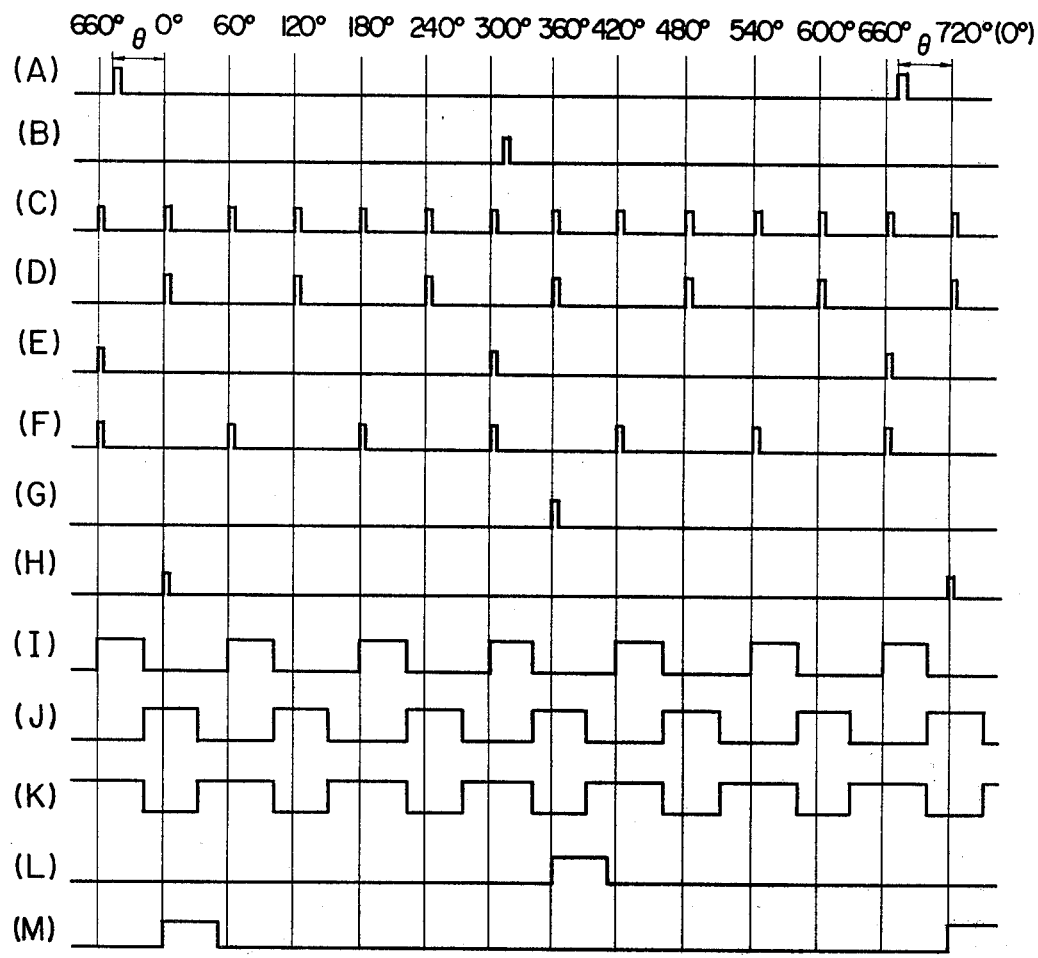
FIG. 3 is a diagram showing typical outputs from respective parts of FIG. 2.

The interruption command unit 101 is impressed with the angle signals (i.e., rotational angle signals) from the rotational sensors 81, 82 and 83 and produces a signal for issuing an interruption command for calculation of the fuel injection amount and an interruption command for calculation of the ignition timing. Thus, the angle signal C of the third rotational angle sensor 83 is frequency-divided by two and an interruption command signal D as shown in FIG. 3D is produced immediately after the angle signal A of the first rotational angle sensor 81 produces the angle signal A. The interruption command signal D is produced six times for every two revolution of the crank shaft, that is, the signal D is provuded for a number of times which number is equal to the number of engine cylinders for every two revolutions of the crank shaft. In the case of a six-cylinder engine, for example, the interruption command signal D is produced once for each crank angle of 120 degrees, thus issuing an interruption command for calculation of the ignition timing to the microprocessor unit 100. The interruption command unit 101, on the other hand, frequency-divides the signal of the third rotational angle sensor 83 by six, and produces an interruption command signal E in response to the sixth angle signal of the first rotational angle sensor 81 and the second rotational angle sensor 82, namely, every 360 degrees (one revolution) starting from the crank angle of 300 degrees. This interruption command signal E issues an interruption command for calculation of the fuel injection amount to the microprocessor unit 100.

Figure 4:
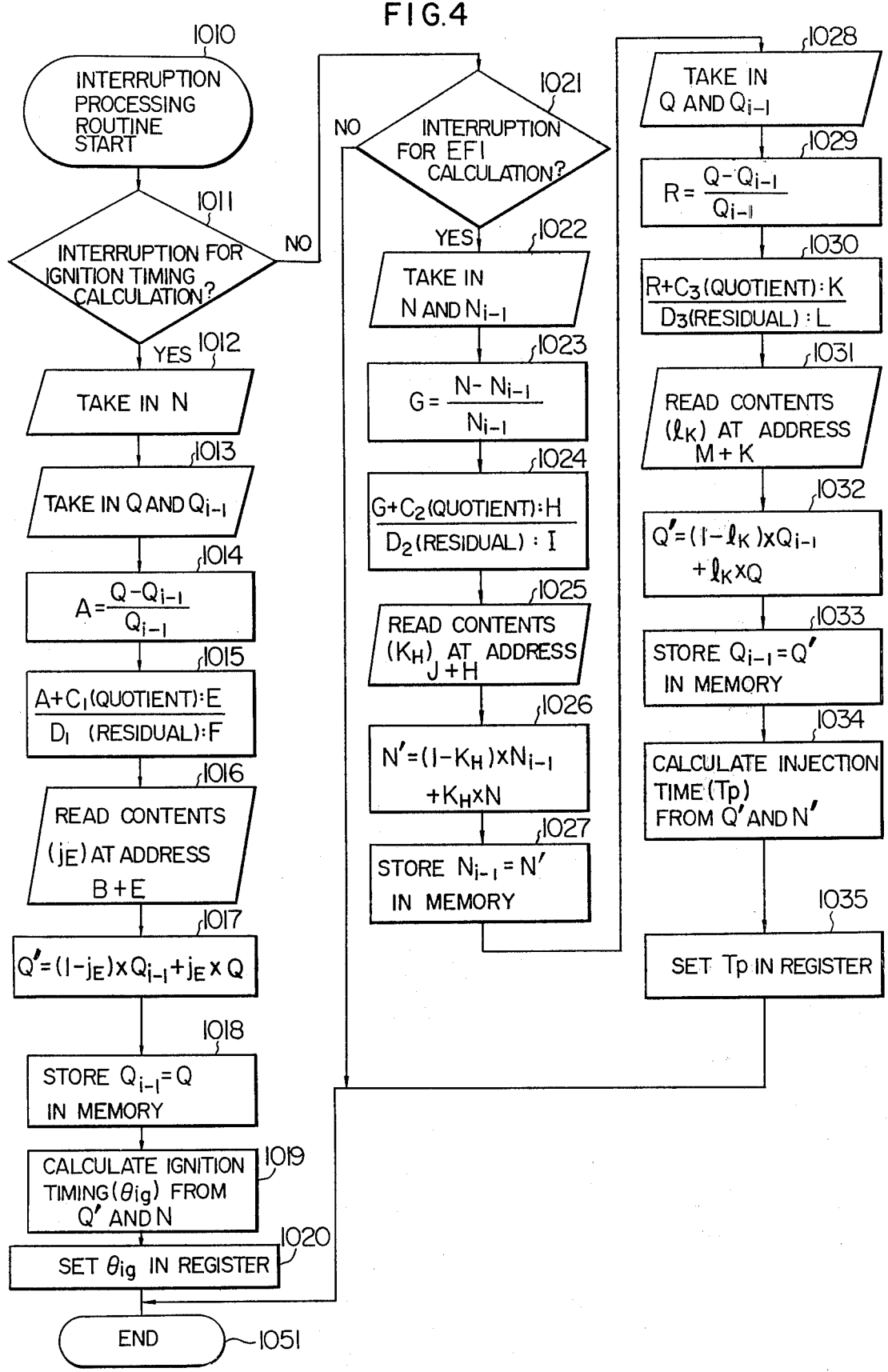
FIG. 4 is a flowchart schematically showing the processes of operation of the microcomputer shown in FIG. 2.

FIG. 4 shows a schematic flowchart for the microprocessor unit 100, with reference to which the functions of the microprocessor unit 100 will be explained below. When the engine is started and the interruption command signal D or E for calculation of the ignition timing or the fuel injection amount shown in FIG. 3D or 3E from the interruption command unit 101 is applied to the microprocessor unit 100, the microprocessor unit immediately enters the interruption processing routine of step 1010 even if it has been processing the main routine. In the case where the interruption command signal D for ignition timing is applied, for example, transfer is made from step 1011 to step 1012 for receiving the signal N representing the engine rotational speed obtained at the rotational speed counter unit 102. Next, at step 1013, the signal Q representing the intake air flow rate obtained from the A-D conversion unit 104 and the previous signal Qi-1 from the address P of the RAM area of the memory unit 105 as shown in FIG. 5 are received. Then, at step 1014, the change rate of the intake air flow rate, i.e., $A=(Q-Qi-1)/Qi-1$ is obtained and at step 1015 the calculation is made for identifying the address within the ROM area of the memory unit 105 containing the factor $j_E$ corresponding to A, and at steo 1016 the required address $B+E$ is obtained. In other words, at step 1015, the calculation of $(A+C1)/D1 = E+F$ (where C1 and D1 are predetermined constants, and F is smaller than D1) is made using the change rate A and at step 1016 it is obtained the address $B+E$ of the ROM area of the memory unit 105 which store the factor $j_E$ as a map at intervals of D1 for the change rate A. The change rate A takes a positive or negative value, but in view of the actual value of A, the value of C1 is selected in such a manner as to obtain the relation $(A+C1)>0$ and also $E \geq 0$. Step 1017 is for effecting the corrective calculation of the intake air flow rate (Q) in accordance with the change rate A, namely, the factor $j_E$. Thus $Q'=(1-j_E) \times Qi-1 + j_E \times Q$. At step 1019, the ignition timing ($\theta$ig) is obtained by a well-known technique from the value Q' thus calculated and the above-mentioned rotational speed signal N. The corrected value Q' is stored at the address P of the RAM area of the memory unit 105 at step 1018 in order to use it as the intake air amount signal Qi-1 for the next interruption processing. The step 1020 is such that the ignition timing $\theta$ig thus obtained is set in the register of the ignition timing control counter unit 106, followed by transfer to step 1050 where the interruption processing is completed.

When the interruption command signal E for fuel injection amount (EFI) is introduced, on the other hand, transfer is made from step 1011 through step 1021 to the step 1022 for receiving the signal N representing the engine rotational speed obtained at the rotational counter unit 102 and the preceding signal Ni-1 from the address P+1 of the RAM area of the memory unit 105. Next, at step 1023, the change rate of the rotational speed $G=(N-Ni-1)/Ni-1$ is obtained. At step 1024, in a manner similar to the step 1015, a calculation is made to determine the address $J+H$ of the ROM area of the memory unit 105 carrying the factor $K_H$ corresponding to the change rate G. At step 1025, the factor $K_H$ is obtained from the address $J+H$. At step 1026, a corrective calculation of the rotational speed N, i.e., $N'=(1-K_H) \times Ni-1 + K_H \times N$ corresponding to the change rate is made from the factor $K_H$. In this way, the value N' is determined. The corrected value N' is stored at the address $P+1$ of the RAM area of the memory unit 105 at step 1027 in order to use it as the rotational speed signal Ni-1 for the next interruption processing. Then transfer is made to step 1028, for receiving the signal Q representing the intake air flow rate obtained from the A-D conversion unit 104 and the preceding value Qi-1 from the address P+2 of the RAM area of the memory unit 105. At step 1029 the change rate of the intake air flow rate $R=(Q-Qi-1)/Qi-1$ is obtained, and at the step 1030 a calculation is made in a manner similar to step 1015 to obtain the address $M+K$ in the ROM area of the memory unit 105 carrying the factor lK corresponding to the change rate R. At step 1031, the factor lK is obtained from the address $M+K$ thus obtained. At step 1032, the corrective calculation $Q'=(1-lK) \times Qi-1 + lK \times Q$ is made to obtain the corrected value Q' of the intake air flow rate Q in accordance with the change rate R from the factor K. The value Q' thus obtained is stored at the address $P+2$ of the RAM area of the memory unit 105 to use it at step 1033 as an intake air amount signal Qi-1 for the next EFI interruption processing. At step 1034, the injection time Tp is obtained by a well-known method from the values Q' and N' obtained as above, followed by step 1036 where the injection time Tp is set in the register of the EFI counter unit 108. Transfer is then made to step 1050 where this interruption processing is completed.

The factors j, k and l stored at the designated addresses of the ROM area of the memory unit 105 in advance will be explained below. The factor j is stored at each address of the ROM area of the memory unit 105 with the characteristics as shown in FIG. 6 for the change rate of the intake air flow rate $A=(Q-Qi-1)/Qi-1$. In other words, j is programmed as a value near to 1 in the range of a small change rate A (near to 0) and as a value near to 0 in the range of a large change rate A. In this way, when the intake air amount Q undergoes a small change, response time is shortened to a degree equal to the output of the sensor, while in the case of a sudden change in the opening of the sluice plate or the air amount sensor 1 which is caused by the driver suddenly opening or closing the throttle, namely, in the range of a large change in the intake air amount Q, the response time is delayed, thus obtaining an intake air amount signal commensurate with the change in air flow rate actually taken into the engine. The factors k and l may also be programmed similarly. Specifically in the case of factor k, the engine and the driving system and vehicle system form the secondary vibration system with the rotational speed as a parameter. In the case where the rotational change continues at the natural frequency of the secondary vibration system, the change rate of the rotation increases, and therefore the factor k used for correction of the rotational signal takes a small value, so that the rotational change is decreased for the rotational signal N' used for calculation of EFI. As a result, the fuel injection amount is supplied stably to the engine, and it is possible to make the change of rotation come to end quickly.

The foregoing is the description of general functions of the miroprocessor unit 100.

Figure 7:
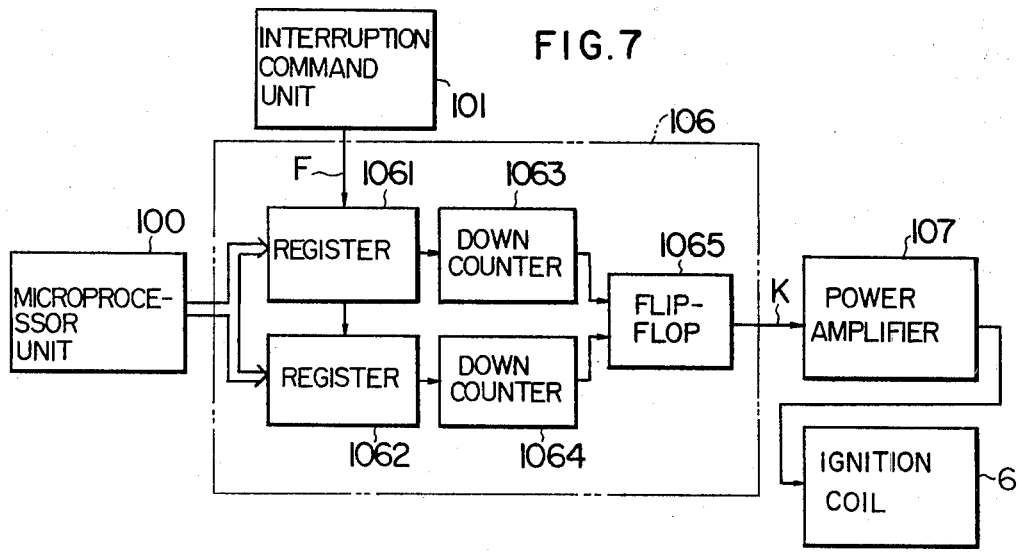
FIG. 7 is a block diagram showing an ignition timing control counter unit shown in FIG. 2.

As shown in FIG. 7, the ignition timing control counter unit 106 comprises a register 1061 for receiving the data from the microprocessor unit 100 representing the timing for cutting off power supply to the ignition coil 6, i.e., the ignition timing, a register 1062 impressed with the data representing the energization starting time, and two down counters 1063 and 1064 for counting down clock signals of predetermined period in response to a predetermined timing signal. The two down counters 1063 and 1064 are impressed with the data from the registers 1061 and 1062 as a digital signal. The ignition timing control counter unit 106 further comprises a flip-flop 1065 connected to the down counters 1063 and 1064 for producing an energizing pulse signal for the ignition coil 6 during the period from the energizing start time to the ignition timing. The counting start timing signal of the down counter 1063 for counting down the ignition timing is an angle signal F generated every 120 degrees of crank angle having the same period as and displaced by half phase (namely, 60 degrees of crank angle) from the signal D for issuing an interruption command for calculation of the ignition timing as shown in FIG. 3F which is generated by the interruption command unit 101. The data representing the ignition timing which is produced from the microprocessor unit 100, namely, the digital signal for, say, a 6-cylinder engine represents the time required from the crank position 60 degrees before the crank angle of 120, 240 degrees or generally 120n degrees of the top dead center to the ignition point. This digital signal starts to be counted by the down counter 1063 in syncrhonism with a clock signal of predetermined period in response to the angle signal F at every point 60 degrees before the top dead center of crank angle, thus determining the crank position for ignition, namely, the ignition timing. As shown in FIG. 3I, the down counter 1063 continues the counting operation while the pulse signal I is being produced, so that the fall point of the pulse signal I makes up the ignition timing. On the other hand, the down counter 1064 for counting the energizing start timing starts the counting operation thereof at the fall point of the pulse signal I as shown in FIG. 3J. Also, the data or the digital signal representing the energization start timing which is applied from the microprocessor unit 100 represents the time required from the fall point of the pulse signal I, namely, the ignition timing to the time point when the ignition coil 6 should start to be energized. The down counter 1064 begins to count down this digital signal at the ignition timing in response to a clock signal of predetermined period, thus determining the energizing time point, which is the fall point of the pulse signal J shown in FIG. 3J. On the basis of the outputs from the two down counters, the flip-flop 1065 produces an energizing pulse signal K to be supplied to the ignition coil 6 during the period from the energizing start point to the ignition timing as shown in FIG. 3K. This pulse signal K is amplified by the power amplifier 107 to control the energization of the ignition coil 6. The high voltage generated in the secondary winding of the ignition coil 6 when energization of the ignition coil 6 is cut off (namely, at the ignition timing) is applied to the spark plugs of the related cylinders sequentially at the ignition timings through the distributor 7. When the engine is started, the register 1061 of the ignition timing control counter unit 106 which is impressed with data representing the energization start timing receives an initial data set at predetermined value.

The fuel injection time control counter unit 108 comprises, as shown in FIG. 8, one register 1081 to which the data representing the fuel injection amount (time) is applied from the microprocessor unit 100, two down counters 1082 and 1083 impressed with digital signals representing the fuel injection amount, namely, the data temporarily held in the register 1081 associated with the two subgroups of the fuel injection valve 4, and two flip-flops 1084 and 1085 connected to the down counters 1082 and 1083 for producing an injection pulse signal during the period from the fuel injection starting time point to the fuel injection end time point. The operation start time point of the down counter 1082 for counting the fuel injection time of the group members 41, 42 and 43 of the fuel injection valve 4 is out of phase by 60 degrees in crank angle from the signal E for issuing an iterruption command for calculation of the fuel injection amount as shown in FIG. 3G, which signal E is generated by the interruption command unit 101. The time point of start of operation of the down counter 1082 thus corresponds to the time points when the angle signal G is produced for every two revolutions of the crank shaft, namely, at the crank positions of 360 degrees, (360+720) degrees, or generally, (360+720n) degrees. The down counter 1082 is supplied with a digital signal representing the fuel injection amount from the register 1081 immediately before receipt of the angle signal G. The down counter 1082 begins to count down this digital signal from the time point of receipt of the angle signal G and thus determines the fuel injection time. The flip-flop 1084 produces a fuel injection pulse signal L as shown in FIG. 3L during the period from the time point when the down counter 1082 begins to count down, namely when the angle signal G is supplied, to the time point when upon completion of the down counting of the down counter 1082 a signal produced is applied to the flip-flop 1084. This pulse signal L is amplified by the amplifier unit 1091 of the power amplifier 109 and supplied to the injection valves 41, 42 and 43 making up one subgroup of the fuel injection valve 4, thus injecting the fuel once for every two revolutions of the crank shaft into the intake manifold of each cylinder associated with the injection valves 41, 42 and 43. The down counter 1083 for counting the fuel injection time of the injection valves 44, 45 and 46 of the other subgroup of the fuel injection valves 4 begins to operate at the time point when the counter 1083 is supplied with the angle signal H shown in FIG. 3H which is generated at the interruption command unit 101. This angle signal H is out of phase by 360 degrees of crank angle, namely, one revolution of crank shaft from the angle signal G and therefore is produced at the crank positions of 0°, 720 degrees and generally at 720n degrees. The down counter 1083 and the flip-flop 1085 operate in a manner similar to the down counter 1082 and the flip-flop 1084 respectively, and the fuel injection pulse signal M as shown in FIG. 3M is produced from the flip-flop 1085. This pulse signal M is amplified by the other amplifier 1092 of the power amplifier 109 and then supplied to the injection valve units 44, 45 and 46 making up the other subgroup of the fuel injection valve 4, thereby injection the fuel at a time point displaced by one revolution, namely, 360 degrees of crank angle from the injection valves 41, 42 and 43.

Next, explanation will be made about an embodiment in which a change in fuel supply amount in the low rotational speed range is prevented. The diagram of FIG. 9 is a flowchart schematically showing the processes of operation of the microprocessor unit 100 for controlling the fuel injection amount to prevent a change in the fuel supply amount in the low rotational speed range. As explained with reference to FIG. 4, upon receipt of the interruption command signal D or E from the interruption command unit 101, the microprocessor unit 100 immediately enters an interruption processing routine of step 1010 even if it has so far been processing the main routine. The processing operation in response to the interruption command signal D for ignition timing is similar to that shown in FIG. 4 and will not be explained again.

When the interruption command signal E for EFI (fuel injection amount) is applied to the microprocessor unit 100, transfer is made from step 1011 to step 1102 for recovering the signal Ni representing the engine rotational speed from the rotational speed counter unit 102 and the rotational speed signal Ni−1 stored in the memory unit 105 at the time of previous interruptive calculation. At step 1103, the calculation $\Delta N = Ni-1 - Ni$ is made to obtain the change rate $\Delta N$ of the rotational speed while at the same time dividing the value $\Delta N$ by the rotational speed signal Ni to obtain the rotational change rate $\Delta N/Ni$. Next at steps 1104 and 1105, the rotational change rate $\Delta N/Ni$ is compared with the predetermined values A and −B ($A>0$, $B>0$), followed by steps 1106, 1107 and 1108 where the rotational speed signal Ni′ used for calculation of the injection amount is obtained. In other words, if $\Delta N/Ni \geq A$, the calculation $(1-\alpha_C) \times Ni - 1 + \alpha_C \times 0)$ is performed at step 1106 to obtain Ni′, while if $\Delta N/Ni \leq -B$, the value of Ni′ satisfying the relation $Ni' = (1-\alpha_D) \times Ni - 1 - \alpha_D \times Ni$ is obtained at step 1107. Further, when $-B < \Delta N/Ni < A$, $Ni'=Ni$ is obtained at step 1108. Next, step 1109 recovers the signal data Q representing the intake air amount from the A-D conversion unit 104, and at the step 1110 the calculation Q/Ni is carried out by using the intake air amount signal Q and the rotational signal Ni′ to obtain the fuel amount required for each injection (namely the corresponding injection time $t_p$). Next, transfer is made to step 1111 for setting the data on the fuel injection amount in the register of the fuel injection time control counter unit 108, and then at step 1112, the data on Ni is stored in the memory unit 105. Transfer is then made to step 1050, where the main routine is restored. In restoring the main routine, return is made to the processing step which has been suspended by interruption.

Although the foregoing description of the embodiments concerns a 6-cylinder engine, the present invention is of course applicable with equal effect to a 4-cylinder or 8-cylinder engine or other multicylinder engine.

What is claimed is:

1. A control system for internal combustion engines comprising:
   means for generating an intake signal related to an intake parameter of an internal combustion engine;
   means for generating a speed signal related to a rotational speed of said engine;
   means for generating timing signals related to rotational positions of said engine;
   means responsive to said timing signals for processing said intake signal and said speed signal to generate a fuel output signal indicative of the amount of fuel to be injected in said engine and an ignition output signal indicative of the timing of ignition spark supplied to said engine, said output signals generating means being programmed to (a) divide an intake difference between the currently generated intake signal and the precedingly generated intake signal by the precedingly generated intake signal to produce a first intake change rate, (b) produce a first intake parameter value from the currently generated intake signal, the precedingly generated intake signal and a predetermined first coefficient dependent on said calculated first intake change rate, (c) determine the timing of ignition spark from said speed signal and said calculated first intake parameter value, (d) divide a speed difference between the currently generated speed signal and the precedingly generated speed signal by the precedingly generated speed signal to produce a speed change rate, (e) produce a speed value from the currently generated speed signal, the precedingly generated speed signal and a predetermined second coefficient dependent on said calculated speed change rate, (f) divide an intake difference between the currently generated intake signal and the precedingly generated intake signal by the precedingly generated intake signal to produce a second intake change rate, (g) produce a second intake parameter value from the currently generated intake signal, the precedingly generated intake signal and a predetermined third coefficient dependent on said second intake change rate, and (h) determine the amount of fuel to be injected from said calculated speed value and said calculated second intake parameter value;
   means responsive to said fuel output signal for controlling the amount of fuel injected in said engine; and
   means responsive to said ignition output signal for controlling the timing of ignition spark supplied to said engine.

2. A control system for internal combustion engines comprising:
   means for generating an intake signal related to an intake parameter of an internal combustion engine;
   means for generating a speed signal related to a rotation speed of said engine;
   means for generating timing signals related to rotational positions of said engine;
   means responsive to said timing signals for processing said intake signal and said speed signal to generate an output signal indicative of the amount of fuel to be injected in said engine, said output signal generating means being programmed to (a) obtain a speed change rate between the currently generated speed signal and the precedingly generated speed signal, (b) produce a speed value using the currently generated speed signal, the precedingly generated speed signal and a first coefficient determined in dependence on said calculated speed change rate, (c) obtain an intake change rate between the currently generated intake signal and the precedingly generated intake signal, (d) produce an intake parameter value using the currently generated intake signal, the precedingly generated intake signal and a second coefficient determined in dependence on said calculated intake change rate, and (e) determine the amount of fuel to be injected using said calculated speed value and said calculated intake parameter value; and
   means responsive to said output signal for controlling the amount of fuel injected in said engine.

3. A control system for internal combustion engines comprising:
   means for generating an intake signal related to an intake parameter of an internal combustion engine;

means for generating a speed signal related to a rotational speed of said engine;

means for generating timing signals related to rotational positions of said engine;

means responsive to said timing signals for processing said intake signal and said speed signal to generate an output signal indicative of the amount of fuel to be injected to said engine, said output generating means being programmed to (a) divide a speed difference between the currently generated speed signal and the precedingly generated speed signal by the currently generated speed signal to produce a speed change rate, (b) compare said calculated speed change rate with a present value, (c) produce a speed value using the currently genrated speed signal and the precedingly generated speed signal in response to the comparison result indicating that said calculated speed change rate is larger than said preset value and using the currently generated speed signal in response to the comparison result indicating that said calcualted speed change rate is smaller than said preset value, and (d) determine the amount of fuel to be injected using said intake signal and said calculated speed value; and means responsive to said output signal for controlling the amount of fuel injected to said engine.

* * * * *